Aug. 14, 1945.  J. HOMER  2,382,484

RAY SIGHT AND FILM HOLDER FOR X-RAY MACHINES

Filed Dec. 24, 1942

INVENTOR.
JOSEPH HOMER
BY William E. Hall
ATTORNEY.

Patented Aug. 14, 1945

2,382,484

UNITED STATES PATENT OFFICE 2,382,484

RAY SIGHT AND FILM HOLDER FOR X-RAY MACHINES

Joseph Homer, Los Angeles, Calif.

Application December 24, 1942, Serial No. 470,317

10 Claims. (Cl. 250—64)

My invention relates to a ray sight and film holder for X-ray machines to facilitate the making of radiographs of teeth, dentures, bones, and the like, in line with the focal axis of an X-ray beam.

One of the principal objects of this invention is to provide a very simple device for holding a sensitized film in line with and normal to the focal axis of the beam of an X-ray tube or machine, one which may be readily manipulated to various positions for making radiographs of teeth, dentures, or bones, and one which may be readily applied to present types of X-ray machines.

Another important object of this invention is to provide a pointer or an index finger in connection with such a device, the point of which is at all times in alignment with the focal axis of the X-ray machine, and which is so positioned that the focal axis or the center of the picture may be readily determined, and which is positioned behind the film so that it will not interfere with image of a tooth, denture, bone, or the like, on the radiograph or roentgenogram.

A further important object of this invention is to provide means for firmly holding a film in substantially any position to facilitate the making of a radiograph or roentgenogram of any tooth, denture, bone, or the like.

A still further object of this invention is to provide means for easily and quickly clamping the film at any portion of its margin against a face, which is normal to the focal axis of the X-ray tube or machine, and particularly against the face of the index means which at all times determines the focal axis of the machine at any desired point on the film.

A still further important object of this invention is to provide means of readily securing the film holder on the head of an X-ray unit or machine, with a minimum of equipment or parts, and in which the ray sight and film holder is supported on a part of the head of the X-ray unit or machine which normally rotates about the focal axis of the machine.

With these and other objects in view, as will appear hereinafter, I have devised a ray sight and film holder of this class which is simple and economical of construction, as will be hereinafter described in detail and particularly set forth in the appended claims; reference being had to the accompanying drawing and the characters of reference thereon which form a part of this application, in which:

My invention may be used with or incorporated in various types of X-ray units employed in the profession, and the device shown may be applied or secured to any suitable portion thereof. The invention, however, will be described as used in connection with a particular type of X-ray unit.

Figure 1:
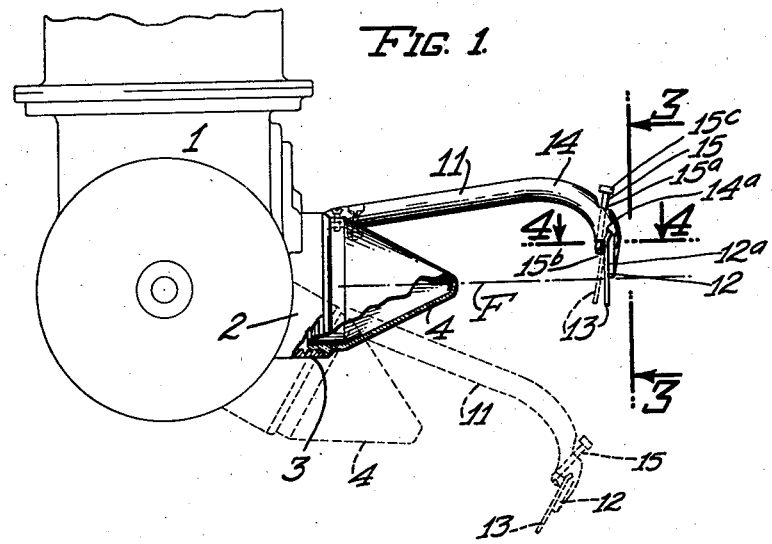
Fig. 1 is a fragmentary side view of the head portion of an X-ray unit showing my ray sight and film holder, in a preferred form of construction, mounted on the head thereof, and showing by dotted lines the head in a downwardly swung position.
Figure 2:
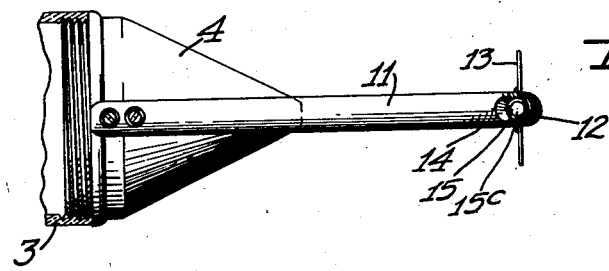
Fig. 2 is an enlarged top view of the film holder shown in Fig. 1.
Figure 3:
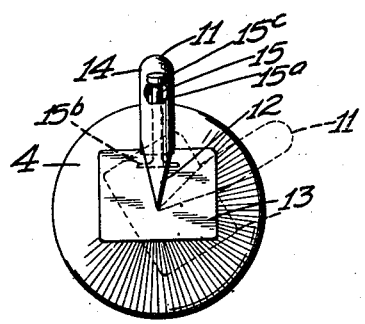
Fig. 3 is an enlarged end view thereof taken at 3—3 of Fig. 1, and showing by dotted lines, the holder shifted in a different angular position about the focal axis; and, Fig. 4 is an enlarged sectional view thereof, taken through 4—4 of Fig. 1.

The X-ray unit, designated 1 in Fig. 1, is customarily provided with a tube 2 which may swing in various angles. The tube 2 through which the X-ray beam emanates is customarily provided at its outer end with an inwardly threaded socket 3, and over the outer end thereof is customarily provided an X-ray penetrable cone member 4, which is screwably attached at its large diameter portion in the threaded socket 3. The apex of the cone member 4 is in line with the focal axis of the X-ray beam.

Figure 4:
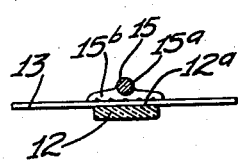

At one side of the cone member is provided an arm 11 for holding a film at its outer end in line with the focal axis of the X-ray machine. The arm may be a rod made of a plastic, metal, or other material, and is secured at its inner end, by screws, integral molding, or other suitable means, to one side of and at the large diameter portion of the cone member. As shown, the arm diverges slightly outwardly from the cone member and with respect to the focal axis. The outer end of the arm is bent in a gradual curve towards the focal axis, to facilitate insertion into the mouth, and is provided at its extreme end with a pointer or an index finger 12, which is pointed, the point thereof lying substantially in the focal axis of the X-ray beam emanating from the tube. The side of the index finger 12, adjacent the X-ray tube, has a flat face 12ª which is substantially normal to said focal axis, and is adapted to receive thereagainst the film 13 employed for making radiographs of teeth, dentures, or bones. In the curved portion 14, joining the straight portion of the arm and the index finger, is provided a film holding means 15. This means consists of a stem or plunger 15ª, which extends at an angle through said rounded portion 14, a jaw 15ᵇ at the inner end of the plunger and a knob 15ᶜ at the outer end thereof for manipulating the member 15. The axis of the plunger 15 makes a slight angle with the face of the index finger, as shown. In the portion 14, at the inner end or edge of the face 12ª of the index finger is a transverse slot 14ª for receiving an edge portion of the film. The plane of the slot, preferably, is located at a slight angle, either obtuse or acute, with respect to the face of the index finger. In the drawing, this angle is shown as acute and is slightly greater than the angle between the axis of the plunger and the face. The slot is narrow so as frictionally to retain the edge portion of the film. The purpose of the angular position of the slot is to bend the edge of the film slightly with respect to the main portion of the film for aiding in holding the film in place before it is secured by the clamping member 15. The jaw 15ᵇ of the film securing member 15 is offset towards the face, is relatively sharp, as shown in Fig. 1, and is provided with teeth, as shown in Fig. 4.

In order to make a radiograph of a tooth, denture, or bone, the edge or corner of a film 13 is inserted into the slot 14ª, the film taking the position substantially as shown by dotted lines in Fig. 1. When the member 15 is drawn outwardly by the knob 15ᶜ, the jaw will approach the face 12ª, bend the film further about the portion secured in the slot, and clamp the film against the face, the combined result of bending of the edge portion of the film and the clamping action of the jaw 15ᵇ securing the film firmly in position.

The position in which the film is placed and secured in the slot and against the face depends upon the nature of the radiograph desired to be obtained.

Though I have shown and described a particular construction, combination, and arrangement of parts and portions of my film holder, I do not wish to be limited to the same, but desire to include in the scope of my invention the construction, combination, and arrangement substantially as set forth in the appended claims.

I claim:

1. In a device of the class described for an X-ray machine, an arm adapted to be secured relative to the X-ray machine so as to extend outwardly from the head of the machine in the general direction of the X-ray beam emanating therefrom, said arm having a face substantially normal to the focal axis of the beam and adapted to receive a film thereagainst, and a film securing means comprising a plunger reciprocally mounted on the arm on an axis extending at a slight angle backwardly from the portion of the face adjacent the supporting arm, said plunger being provided at one end with a transverse jaw parallel to the face for clamping a film against the latter, the outer end portion of the plunger diverging from the face.

2. In a device of the class described for an X-ray machine, an arm adapted to be secured relative to the X-ray machine so as to extend outwardly from the head of the machine in the general direction of the X-ray beam emanating therefrom, said arm having a face substantially normal to the focal axis of the beam, said arm being also provided with a transverse slot adjacent the face, the plane of the slot extending backwardly at a slight angle from and with respect to the face, one edge of a film being adapted to extend into said slot, and a film securing means comprising a plunger reciprocally mounted on the arm on an axis extending at a slight angle backwardly from the portion of the face adjacent the supporting arm, said plunger being positioned between the slot and the head of the X-ray machine, and the angle between the plunger and the face being less than the angle between the slot and said face, said plunger being provided at one end with a transverse jaw parallel to the face for clamping said film against the latter.

3. In a device of the class described for an X-ray machine, an arm adapted to be secured relative to the X-ray machine so as to extend outwardly from the head of the machine in the general direction of the X-ray beam emanating therefrom, said arm having an index finger, the end thereof lying substantially in the focal axis of the beam, and means on the arm for securing a film between the X-ray machine and the index finger.

4. In a device of the class described for an X-ray machine, an arm adapted to be secured relative to the X-ray machine so as to extend outwardly from the head of the machine in the general direction of the X-ray beam emanating therefrom, said arm having an index finger, the end thereof lying substantially in the focal axis of the beam, the side of the index finger adjacent to the X-ray machine having a face substantially normal to said focal axis, and a film securing means on the arm for holding the film against said face.

5. In a device of the class described for an X-ray machine, an arm adapted to be secured relative to the X-ray machine so as to extend outwardly from the head of the machine in the general direction of the X-ray beam emanating therefrom, said arm having an index finger, the end thereof lying substantially in the focal axis of the beam, said arm also being provided with a transverse slot adjacent the finger, one edge of a film being adapted to extend into said slot, and means on the arm for securing the film in the slot.

6. In a device of the class described for an X-ray machine, an arm adapted to be secured relative to the X-ray machine so as to extend outwardly from the head of the machine in the general direction of the X-ray beam emanating therefrom, said arm having an index finger, the end thereof lying substantially in the focal axis, the side of the index finger adjacent to the X-ray machine having a face substantially normal to said focal axis, said arm being also provided with a transverse slot adjacent the finger, the plane of the slot extending backwardly at a slight angle from and with respect to the face of the finger, one edge of a film being adapted to extend into said slot, and a film securing means on the arm for holding the film against said face.

7. In an X-ray machine, an X-ray tube head for projecting an X-ray beam, said head having a threaded end coaxial with the X-ray beam emanating from the head, a cone member screwably mounted on the threaded end of said head, the apex of the cone extending outwardly from said head and aligned with said focal axis, a film holding arm extending outwardly from the cone member with one end secured to one side of the large diameter portion of the cone member, an index finger at the outer end of the arm, the end thereof lying substantially in said focal axis, and means on the arm for securing a film between the X-ray tube head and the index finger.

8. In an X-ray machine, an X-ray tube head for projecting an X-ray beam, said head having a threaded end coaxial with the X-ray beam emanating from the head, a cone member screwably mounted on the threaded end of said head, the apex of the cone extending outwardly from said head and aligned with said focal axis, an arm extending outwardly from the cone member with one end secured to one side of the large diameter portion of the cone member, said arm having an index finger, the end thereof lying substantially in said focal axis, the side of the index finger adjacent the head having a face substantially normal to said focal axis, and a film securing means on the arm for holding a film against said face.

9. In an X-ray machine, an X-ray tube head for projecting an X-ray beam, said head having a threaded end coaxial with the X-ray beam emanating from the head, a cone member screwably mounted on the threaded end of said head, the apex of the cone extending outwardly from said head and aligned with said focal axis, an index arm extending outwardly from the cone member with one end secured to one side of the large diameter portion of the cone member and adjustable circumferentially about said axis with the rotation of the cone, said arm being provided at its outer end with an index finger, the end thereof lying substantially in said focal axis, the finger being constructed for receiving a film thereagainst and for guiding the positioning of the film.

10. In an X-ray machine, an X-ray tube head for projecting an X-ray beam, said head having a threaded end coaxial with the X-ray beam emanating from the head, a cone member screwably mounted on the threaded end of said head, the apex of the cone extending outwardly from said head and aligned with said focal axis, and an index arm extending outwardly from the cone member with one end secured to one side of the large diameter portion of the cone member, and adjustable circumferentially about said axis with the rotation of the cone, said arm being provided at its outer end with an index finger, the end thereof lying substantially in said focal axis, said finger having a face substantially normal to said focal axis, the finger being constructed for receiving a film flatwise against said face and for guiding the positioning of the film.

JOSEPH HOMER.